3,573,232
**PROCESS FOR THE PRODUCTION OF
FOAMED MATERIALS**
Werner Kloker, Krefeld-Uerdingen, Franz Alfes, Krefeld,
Leonhard Goerden, Oedt, Rhineland, and Karl Raichle,
Krefeld-Bockum, Germany, assignors to Farbenfabriken
Bayer Aktiengesellschaft, Leverkusen, Germany
No Drawing. Filed July 17, 1967, Ser. No. 653,664
Claims priority, application Germany, July 21, 1966,
F 49,750
Int. Cl. C08f 47/10; C08v 1/22
U.S. Cl. 260—2.5                              12 Claims

ABSTRACT OF THE DISCLOSURE

Improved process of producing foamed materials from a copolymerizable mixture of unsaturated polyesters and a monomeric polymerizable vinyl compound employing as foaming agent a carbonic acid ester anhydride wherein said foaming agent liberates carbon dioxide without the application of external heat by virtue of the presence of certain metal compounds.

---

Foamed materials may be produced by heating synthetic materials with a content of compounds which split off expanding agents by thermal decomposition. As compounds which split off expanding agents there may be used, inter alia, those compounds which contain carbonic acid ester anhydride, especially carboxylic acid-carbonic acid ester anhydride groups. Compounds of this type split off carbon dioxide which acts as expanding agent for the synthetic material, at elevated temperatures lying, as a rule, between about 90° C. and about 150° C., depending on the composition of the compounds.

The special advantage of this process consists in that as decomposition products there are formed, besides carbon dioxide, almost exclusively carboxylic acid esters which, if they do not themselves take part in the structure of the molecule of the synthetic material, are well compatible with most synthetic materials; such carbonic acid esters are frequently incorporated with the synthetic materials as plasticisers.

This process is applicable not only to the foaming of thermoplastic synthetic material, but also to cross-linkable synthetic materials, for example, also to mixtures of unsaturated polyesters with monomeric copolymerizable vinyl compounds, which can be polymerized by the addition of a catalyst and are briefly called polyester resins. In this case the type and amount of the polymerization catalyst must be so chosen that at the temperature at which the carbonic acid ester anhydride splits off carbon dioxide, the copolymerization simultaneously takes place, i.e. that the foaming process and the cross-linking process proceed synchronously. Since, however, both reactions are initiated only after external heat supply and the copolymerization is an exothermic process, it is difficult so to control the process that the right temperature is always adjusted in the reaction mixture at the right time, in order to ensure the aforesaid synchronization.

The object of the present invention comprises an improved, i.e. an easily controllable, process for the production of foamed materials by foaming copolymerizable mixtures of unsaturated polyesters and monomeric copolymerizable vinyl compounds with a content of polymerization catalysts by decomposition of carbonic acid ester anhydrides contained in the mixtures.

This process comprises adding to the mixtures, in order to reduce the decomposition temperature of the carbonic acid ester anhydride, soluble compounds of polyvalent metals, especially of metals of the second and fourth main and auxiliary groups and of the third, fifth, sixth and seventh auxiliary groups of the Periodic System, including the rare earths and the metals copper, iron and cobalt, in amounts of about 0.01 to 50 percent by weight, referred to the amount of carbonic acid ester anhydride present, and a catalyst-accelerator system which brings about the cold-hardening of the unsaturated polyester resins.

This process is based on the knowledge that certain metal compounds which are characterized above and of which typical representatives will be mentioned further below, are suitable to reduce the decomposition temperature of carbonic acid ester anhydrides to room temperature. Since, as has been mentioned above, these specific carbonic acid ester anhydride-metal combinations are combined according to the invention with a known cold-hardening adjustment of the polyester-monomer mixture, this process requires no external heat supply, and the difficulties mentioned above which occur in the known process in which foaming and hardening take place only at elevated temperatures and therefore only after external heat supply, are thus obviated.

For the synchronous course of the foaming process and the hardening process it is not only important that both processes start at the same temperature and the same time, but also that they require approximately the same time for their completion; on the other hand, the foaming time is determined by the intensity of the decomposition of the carbonic acid ester anhydride and this, in turn, depends on the chemical structure of the latter and on the type and amount of the metal compound affecting the decomposition, whereas the velocity of hardening is known to be a function of the reactivity of the unsaturated polyester and the monomeric vinyl compound and on their proportions, on the type and amount of the peroxide used and on the type and amount of the matching polymerization accelerator and, possibly, on the type and amount of a polymerization inhiibtor which may have been added; it is therefore necessary to harmonize these 10 or 12 factors.

This can easily be achieved by preliminary experiments. It is expedient to establish first in a partial experiment the type and amount of the metal compound to be added, within the limits mentioned above, to the carbonic acid ester anhydride which has been arbitrarily chosen and dissolved in the unsaturated polyester, in order that the decomposition of the carbonic acid ester anhydride proceeds to completion within the time provided for the production of the foamed material, for example, within 5 to about 60 minutes. In a second experiment there is established the type and amount of the polymerization catalyst — diacyl peroxide or hydroperoxide — and the type and amount of the matching accelerator—N,N-dialkylarylamine or heavy metal compound, e.g. cobalt compound—and possibly the type and amount of an inhibitor, to be added to an arbitrarily chosen mixture of an unsaturated polyester, a monomeric copolymerisable vinyl compound and a carbonic acid ester anhydride for this mixture to harden approximately within the same period of time in which the decomposition of the carbonic acid ester anhydride is completed according to the first partial experiment. It is then only necessary to combine the two partial experiments to obtain the final mixture, i.e. the amounts of the individual additives established in the two partial experiments are added to the chosen polyester-monomer mixture within a short time with thorough mixing. Foaming and hardening then spontaneously set in and are completed after the period of time previously adjusted. Those polyester resins which are transformed comparatively slowly from the liquid into the gel-like state in the course of the hardening operation, are particularly suitable for foaming.

Foamed materials of particularly low density are obtained by:

(1) Using an unsaturated polyester resin of low reactivity and high vicosity, e.g. 10,000 centipoises and more, which may moreover costain thickening agents, such as highly etherified cellulose, (2) Adding known foam stabilisers, such as polysiloxane copolymers, to the polyester resin, and (3) Choosing a cold-hardening system in which the time between gelling and solidification is not too short, i.e. in which the gel-like state is maintained especially long. From the large number of combinations which are possible according to the invention, a few typical combinations which are particularly suitable for the process are assembled below (see Table 7).

dimerised fatty acids, or long-chain diols, such as triethylene glycol.

As mentioned above, in general, polyester resins of low reactivity are preferred. Polyesters with low reactivity are those in which the content of gram mole radicals of ethylene dicarboxylic acids in 100 g. polyester is less than 0.2. In polyesters with middle reactivity this content amounts to 0.2 to 0.3 gram moles, and in polyesters with high reactivity this content amounts to more than 0.3 gram moles.

As copolymerizable monomers there may be used, for example, styrene, mono- and dichlorostyrene, divinylbenzene, vinyltoluene; further vinyl esters, such as vinyl acetate and vinyl benzoate, and also unsaturated carboxylic acids and their derivatives, such as acrylic acid, acrylic ester and acrylonitrile and methacrylic acid and the corresponding derivatives, such as methacrylic acid methyl ester; finally, allyl esters, such as allyl acrylate, phthalic acid diallyl ester, triallyl cyanurate and triallyl phosphate.

The polyester-monomer mixtures, referred to in the following as unsaturated polyester resins, should contain 10 to 70 percent by weight, preferably 20 to 50 percent by weight, of the copolymerizable, ethylenic-unsaturated monomer compounds, referred to the total weight of the mixture.

Examples of carbonic acid ester anhydrides which are to be used according to the invention and can be prepared,

TABLE 1

30 g. of a commercial pol ester resin of low reactivity with a visocosity of 10,000 centipoises at 20° C.
0.39 g. polysiloxane-hydroxyalkylene copolymer.
0.67 g. of a 50% solution of the sodium salt of sulphonated castor oil in H₂O 3 g. foaming agent (types IM amd MA).
Various amounts of different foaming agent decomposition catalysts and various amounts of hardener and accelerator.

| Foaming agent type | Foaming agent decomposition catalyst | | Amount of solution grams | Hardener | | Accelerator | | Inhibitor¹ Amount grams | Density of foam (g./cc.) | Remarks |
|---|---|---|---|---|---|---|---|---|---|---|
| | Type | Metal content of solution, Percent | | Type | Amount grams | Type | Amount grams | | | |
| 1(a) | MA² | Co-Naph. | 2.2 | 1.8 | BP | 3.0 | Amine | 0.9 | | N.f. | Hardening too fast. |
| 1(b) | MA² | Co-Naph. | 2.2 | 1.8 | BP | 1.2 | ...do..... | 0.2 | 0.2 | N.f. | Hardening too slow. |
| 1(c) | MA² | Co-Naph. | 2.2 | 1.8 | BP | 0.75 | ...do..... | 0.15 | | 0.24 | |
| 2(a) | MA | La-Naph. | 14 | 2.0 | BP | 3.0 | ...do..... | 0.9 | | N.f. | Hardening too fast. |
| 2(b) | MA | La-Naph. | 14 | 2.0 | BP | 1.2 | ...do..... | 0.2 | 0.1 | N.f. | Hardening too slow. |
| 2(c) | MA | La-Naph. | 14 | 2.0 | BP | 1.2 | ...do..... | 0.15 | | 0.19 | |
| 3(a) | IM³ | Co-Naph. | 2.2 | 0.9 | BP | 3.0 | ...do..... | 0.9 | | N.f. | Hardening too fast. |
| 3(b) | IM³ | Co-Naph. | 2.2 | 0.9 | BP | 1.2 | ...do..... | 0.2 | 0.2 | N.f. | Hardening too slow. |
| 3(c) | IM³ | Co-Naph. | 2.2 | 0.9 | BP | 0.75 | ...do..... | 0.2 | | 0.21 | |
| 4(a) | IM | La-Naph. | 14 | 0.9 | BP | 3.0 | ...do..... | 0.9 | | N.f. | Hardening too fast. |
| 4(b) | IM | La-Naph. | 14 | 0.9 | BP | 1.2 | ...do..... | 0.2 | 0.1 | N.f. | Hardening too slow. |
| 4(c) | IM | La-Naph. | 14 | 0.9 | BP | 1.2 | ...do..... | 0.2 | | 0.21 | |
| 5(a) | IM | Ca-Naph. | 4 | 1.2 | AP | 0.9 | Co-acc. | 0.3 | 0.1 | N.f. | Hardening too slow. |
| 5(b) | IM | Ca-Naph. | 4 | 1.2 | AP | 1.5 | Co-acc. | 0.6 | | 0.17 | |
| 6 | {IM | Co-Naph. | 2.2 | 0.9 | AP | 0.3 | | | 0.1 | N.f. | }Hardening too slow. |
| | {IM | Co-Naph. | 2.2 | 1.5 | AP | 0.6 | | | | 0.19 | |
| 7 | {MA | Co-Naph. | 2.2 | 0.9 | AP | 0.3 | | | 0.1 | N.f. | }Hardening too slow. |
| | {MA | Co-Naph. | 2.2 | 1.5 | AP | 0.6 | | | | 0.21 | |

¹ 10% solution of toluhydroquinone in unsat. polyester resin, see Examples 1 and 4.
² MA=methacrylic acid-carbonic acid ethyl ester anhydride.
³ IM=isophthalic acid-bis-(carbonic acid methyl ester) anhydride.
Co-Naph.=solution of cobalt-naphthenate in styrene; La-Naph.=solution of lanthanum-naphthenate in styrene; Ca-Naph.=solution of calcium naphthenate in stryrene; Amine accelerator=10% solution of N,N-dimethyl-paratoluidine in o-phthlaic acid diester; Co accelerator=solution of cobalt-naphthenate in styrene (metal content 1%); BP paste=benzoyl peroxide, 50% in phthalate plasticiser; AP paste=cyclohexanone peroxide paste, 50% in phthalate plasticiser; N.f.=No foamed material.

The unsaturated polyesters are prepared in known manner (of e.g. the book by I. Bjöcksten "Polyesters and their Application," Reinhold Pattishins Corp., New York, 1956) by polycondensation of polyhydric, especially dihydric, alcohols, such as, for example, ethylene glycols, polyethylene glycols, neopentyl glycol, propylene glycols, polypropylene glycols, butane diol-1,3 and 1,4, pentane diol-1,5, hexane diol-1,6, cyclohexane diol-1,4, perhydrobisphenols, bis-(β-hydroxyethoxy phenyl)-alkanes, glycerol, trimethylol ethane, -propane and -butane etc., with ethylene-1,2-dicarboxylic acids or their anhydrides, such as fumaric acid or maleic acid anhydride, optionally with the addition of saturated dicarboxylic acids, such as phthalic acid or its anhydride, isophthalic acid, hexachloro-endomethylene-tetrahydrophthalic acid or its anhydride, succinic acid, adipic acid or sebacic acid. For the production of elastic foams it is advantageous to use long-chain aliphatic dicarboxylic acids, such as for example, by one of the processes described in German patent specification Nos. 1,133,727 and 1,210,853, are; pyrocarbonic acid diethyl ester, acetic acid-carbonic acid ethyl ester anhydride, propionic acid-carbonic acid ethyl ester anhydride, sebacic acid-bis-(carbonic acid methyl ester) anhydride, adipic acid-bis-(carbonic acid methyl ester) anhydride, crotonic acid-carbonic acid methyl ester anhydride, sorbic acid-carbonic acid ethyl ester anhydride and 1,6-hexane-diol-poly-(carbonic acid ester-isophthalic acid anhydride). Especially suitable are carboxylic acid-carbonic acid ester anhydrides which are as stable as possible at room temperature, such as benzoic acid-carbonic acid methyl ester anhydride, benzoic acid-carbonic acid ethyl ester anhydride, diethylene-glycol-bis-(carbonic acid-benzoic acid) anhydride, isophthalic acid-bis-(carbonic acid methyl ester) anhydride, isophthalic acid-bis-(carbonic acid ethyl ester) anhydride and terephthalic acid-monomethyl ester-carbonic acid ethyl ester anhydride. Mixtures of two or more carboxylic acid-carbonic acid ester anhydrides are also used, if desired, for example, a mixture of 70 percent by weight isophthalic acid-bis-(carbonic acid methyl ester) anhydride and 30 percent by weight terephthalic acid-bis-(carbonic acid methyl ester) anhydride.

If those carbonic acid ester anhydrides are used, which contain ethylenic-unsaturated copolymerizable radicals, then the corresponding esters formed as splitting products are incorporated with the foamed materials. Examples are acrylic acid-carbonic acid ethyl ester anhydride, methacrylic acid-carbonic acid methyl ester anhydride and isophthalic acid-bis-(carbonic acid allyl ester) anhydride. The foamable and hardenable masses should contain 1 to 50 percent by weight, preferably 5 to 20 percent by weight, of carbonic acid ester anhydrides, referred to the total weight of the mixture.

The following metal compounds exhibit an effect on carbonic acid ester anhydrides as decomposition catalysts: Calcium decanate, magnesium acetylacetonate, zinc octoate, lanthanium naphthenate, cerium naphthenate, zirconium naphthenate, lead octoate, vanadium resinate, chromium naphthenate, manganese naphthenate, copper naphthenate, iron naphthenate, cobalt naphthenate, cobalt octoate.

The calcium, magnesium and cobalt compounds mentioned above are particularly effective.

Suitable hardening catalyst systems are, in principle, all catalyst-accelerator combinations which are customarily used for the polymerization of mixtures of unsaturated polyesters and unsaturated compounds copolymerizable therewith at room temperature, for example, an acyl peroxide, such as benzoyl peroxide, acetyl benzoyl peroxide, phthalic peroxide, dibutyryl peroxide, succinyl peroxide, lauroyl peroxide, coconut oil acid peroxide and oleic peroxide, as catalyst and an amine, preferably a tertiary aromatic amine, such as dimethyl- and diethyl aniline, dimethyl- and diethyl-p-toluidine etc. as accelerator, or a hydroperoxide, such as methyl ethyl ketone hydroperoxide, diethyl ketone hydroperoxide, cyclohexanone hydroperoxide etc., as catalyst and a metal soap, such as lead, manganese and particularly cobalt palmitate, stearate, naphthenate etc., as polymerization accelerator. In the latter case, the metal compound simultaneously acts as decomposition catalyst for the carbonic acid ester anhydride.

Examples of inhibitors which may be added are quinone, hydroquinone, toluhydroquinone, 2,5-di-tert.-butylquinone and 2,6-di-tert.-butyl-p-cresol in amounts of 0.005 to 1.0 percent by weight, preferably 0.01 to 0.1 percent by weight.

The density of the foamed materials can be varied within wide limits by increasing or reducing the amount of carbonic acid ester anhydride and/or decomposition metal compounds, or by shortening or lengthening the gelling time of the foamable masses.

The foam structure can be improved, if desired, by the addition of foam stabilisers, such as polysiloxane copolymers, and/or of wetting agents, such as sulphonated castor oil.

The quantity of the said auxiliaries to be used will generally amount to between 0.1 and 5 percent by weight, referred to the total weight of the mass.

As has been mentioned above, the foam structure can also be influenced by the addition of thickening agents. Besides the cellulose ethers already mentioned, polyisocyanates and highly dispersed silicon dioxide are suitable for this purpose, for example. Unsaturated polyester resins previously thickened with magnesium oxide can also be used with advantage.

It is also possible to add inorganic or organic fillers, e.g. fibres, to the foamable polyester moulding masses. Granulated fillers with a bulk weight of less than 1 are preferably used, e.g. expanded clay, slack or pumice, which may amount to a multiple, referred to the parts by volume of the polyester moulding mass. There are thus obtained very light, solid mouldings of good dimensional stability and good thermal stability with a polyester resin proportion in the range of 5–80 percent by weight, which are suitable as structural plates, prefabricated structural elements, such as partitions, parapet plates, wall covers for sound and heat proofing, and for insulations.

It may be advisable either to admix flame inhibiting products or to use self-extinguishing types of polyester.

The structure and stability of the polyester foam moulding can be improved by an addition of polyisocyanates in amounts of, for example, 5–25 percent by weight, referred to the foamable and hardenable mass.

EXAMPLE 1

An unsaturated polyester with the acid number 30, prepared by condensation of 11,350 parts by weight maleic acid anhydride, 31,840 parts by weight phthalic acid anhydride, 14,900 parts by weight, 1,3-butane-diol, 17,540 parts by weight diglycol and 15,390 parts by weight castor oil with the addition of 13.2 parts by weight hydroquinone, is dissolved in sufficient parts by weight styrene to form a solution which contains 80 parts by weight of solid product and has a viscosity of 11,970 centipoises at 20° C.

60 g. of this polyester resin are intensely mixed with 28.8 g. isophthalic acid-bis-(carbonic acid methyl ester) anhydride, 10. AP paste (cyclohexanone peroxide, 50% in plasticiser), and 10.8 g. of cobalt accelerator (20% solution of cobalt naphthenate in styrene; the content of cobalt metal amounts to 2.2%) in the order as stated in a polyethylene beaker of 2000 ml. capacity by means of a rapid stirrer. After stirring, the foam slowly develops and reaches the maximum height after about 15 minutes. The density of the resultant foamed material amounts to 0.22 g./sec.

EXAMPLE 2

360 g. of the polyester resin prepared according to Example 1 are intensely mixed, in the same manner as described in Example 1, with 28.8 g. of a triisocyanate solution (reaction product of 2 moles toluylene-2,4-diisocyanate and 1 mole toluylene-2,6-diisocyanate with 1 mole trimethylolpropane, 66 solution in styrene), 28.8 g. isophthalic acid-bis-(carbonic acid methyl ester) anhydride, 10.8 g. of AP paste and 10.8 g. of cobalt accelerator (cobalt content 2.2%). The resultant foamed material has a density of 0.24 g./cc. and exhibits a better structure and higher stability than the product obtained according to Example 1.

EXAMPLE 3

In the instruction given in Example 1 the isophthalic acid-bis-(carbonic acid methyl ester) anhydride is replaced with the same amount of methacrylic acid-carbonic acid methyl ester anhydride. The foam thus obtained has a density of 0.24 g./cc.

EXAMPLE 4

360 g. of a commercial unsaturated polyester resin of low reactivity and with a viscosity of about 10,000 centipoises at 20° C., 36 g. triisocyanate solution 28.8 g. isophthalic acid-bis-(carbonic acid methyl ester) anhydride), 10.8 g. AP paste 10.8 g. cobalt accelerator (as in Example 1) and 1.0 g. inhibitor solution (10% solution of toluhydroquinone in unsaturated polyester resin, see Example 1)

are thoroughly mixed in the order as stated by means of a rapid stirrer.

The density of the resultant foamed material amounts to 0.16 g./cc.

EXAMPLE 5

1200 g. of unsaturated polyester resin (prepared according to Example 1)
100 g. triisocyanate solution
96 g. isophthalic acid-bis-(carbonic acid methyl ester) anhydride
24 g. AP paste and
36 g. cobalt accelerator (cobalt content 2.2%)

are intensely mixed in the order as stated and poured into a cubic steel mould with an edge length of 20 cm. The mould is then filled up with about 3 kg. of expanded clay with a particle size of 10–15 mm. and covered with a wire mesh which is loaded with suitable weights. The expanded clay-polyester foam thus prepared has a density of 0.55 g./cc.

EXAMPLE 6

300 g. of unsaturated polyester resin (prepared according to Example 1)
30 g. triisocyanate solution
24 g. isophthalic acid-bis-(carbonic acid methyl ester) anhydride
12 g. benzoyl peroxide paste
6 g. manganese naphthenate solution (manganese content 6%) and
1.5 g. dimethyl-p-toluidine are intensely mixed by means of a rapid stirrer in a polyethylene beaker of 2 litres capacity. A foam of density 0.22 g./cc. is formed.

EXAMPLE 7

100 g. of unsaturated polyester resin (prepared according to Example 1)
10 g. isophthalic acid-bis-(carbonic acid methyl ester) anhydride
0.62 g. of a 10% solution of dimethyl-p-toluidine in styrene
1.16 g. polysiloxane-hydroxyalkylene copolymer and
2.03 g. of a 50% solution of the sodium salt of sulphonated castor oil in distilled water are intensely mixed by means of a rapid stirrer. Subsequently there are added 3.0 g. of a benzoyl peroxide paste and one of the soluble metal compounds set out in Table 1 in the amount there stated.

TABLE I

| Amount | Metal compound | Metal content | Density of foamed material, g./cc. |
|---|---|---|---|
| 4 grams | Calcium naphthenate solution | 4% Ca | [1] 0.15 |
| Do | Iron naphthenate solution | 6% Fe | [1] 0.40 |
| 2 grams | Chromium naphthenate solution | 8% Cr | [1] 0.36 |
| 4 grams | Calcium decanate solution | 4% Ca | [1] 0.15 |
| Do | Copper naphthenate solution | 1% Cu | [1] 0.40 |

[1] Approximately.

EXAMPLE 8

In the instruction given in Example 7 the dimethyl p-toluidine solution is replaced with the following mixture 0.5 g. of a 10% solution of dimethyl-p-toluidine in styrene 0.5 g. of a 10% solution of dimethyl-aniline in styrene.

To each of the mixtures one of the soluble metal salts set out in Table II is added as foaming agent in the amount there stated:

TABLE II

| Amount | Metal compound | Metal content | Density of foamed mate. rial, g./cc |
|---|---|---|---|
| 3 grams | Zirconium naphthenate solution | 6% Zr | [2] 0.36 |
| Do | Lanthanium naphthenate solution | 14% La | [2] 0.20 |
| 4 grams | Cerium naphthenate solution | 6% Ce | [2] 0.55 |
| Do | Lead octoate solution | 24% Pb | [2] 0.28 |
| Do | Zinc octoate solution | 8% Zn | [2] 0.24 |

[2] Approximately.

EXAMPLE 9

3 g. isophthalic acid-bis-(carbonic acid methyl ester) anhydride are dissolved in 30 g. of the polyester resin prepared according to Example 1. The following additives are added in the order as indicated and admixed by means of a rapid stirrer in a beaker.

0.39 g. polysiloxane-hydroxyalkylene copolymer
0.67 g. of a 50% solution of the sodium salt of sulphonated castor oil in distilled water
0.04 g. toluhydroquinone
1.2 g. benzoyl peroxide paste
1.0 g. dimethyl aniline solution (20% in styrene) and
2.3 g. of a 20% magnesium acetyl-acetonate solution in styrene: dimethyl formamide 1:1.

The resultant foamed material has a density of 0.15 g./cc.

EXAMPLE 10

30 parts by weight of the unsaturated polyester resin described in Example 1 are intensely mixed in a cardboard beaker and in the order as indicated with 3.5 parts by weight pyrocarbonic acid diethyl ester, 0.39 part by weight of polysiloxane copolymer, 0.67 part by weight of a 50% solution of the sodium salt of sulphonated castor oil in distilled water, 2.5 parts of a calcium decanate solution containing 4 percent by weight calcium, 1 part by weight of a 20% solution of dimethyl-aniline in styrene and 1.2 parts by weight of a benzoyl peroxide paste (50%). A fine-pore foamed material is formed the density of which amounts to 0.19 g./cc.

What is claimed is:
1. A process for the production of foamed materials from a copolymerizable mixture of unsaturated polyesters which are polycondensation products of ethylene dicarboxylic acid and polyhydric alcohols, and monomeric polymerizable vinyl compounds which comprises adding to the copolymerizable mixture
   (a) an organic peroxide as polymerization catalyst,
   (b) an accelerator adapted to the peroxide catalyst to reduce the temperature of the reactivity of the catalyst to room temperature,
   (c) a carbonic acid ester anhydride decomposing with splitting off of carbon dioxide and
   (d) a compound of a polyvalent metal of the second or fourth main and auxiliary groups and of the third, fifth, sixth or seventh auxiliary groups of the Periodic System, including the rare earths and the metals copper, iron and cobalt, in amounts of about 0.01 to about 50 percent by weight, referred to the amount of carbonic acid ester anhydride present, said metal compound being soluble in the copolymerization mixture and reducing the decomposition temperature of the carbonic acid ester anhydride of (c) to room temperature and allowing said mixture to foam in the absence of externally applied heating.

2. Process according to claim 1, wherein the unsaturated polyester has a low reactivity.

3. Process according to claim 1, wherein the polymerization catalyst (a) is an acyl peroxide and the accelerator (b) is an amine.

4. Process according to claim 1, wherein the polymerization catalyst (a) is a hydroperoxide and the accelerator (b) is a metal soap.

5. Process according to claim 1, wherein the carbonic acid ester anhydride is a carboxylic acid-carbonic acid ester anhydride.

6. Process according to claim 1, wherein the content of the carbonic acid meter anhydride amounts to about 1 to about 50 percent by weight, referred to the total amount of the mixture.

7. Process according to claim 1, wherein the metal compound (d) is a calcium, magnesium or cobalt compound.

8. Process according to claim 1, wherein the mixture has an additional content of an inhibitor.

9. Process according to claim 1, wherein the mixture has an additional content of a foam stabilizer.

10. Process according to claim 1, wherein the mixture has an additional content of a wetting agent.

11. Process according to claim 1, wherein the mixture has an additional content of a thickening agent.

12. Process according to claim 1, wherein the mixture has an additional content of fillers.

References Cited

UNITED STATES PATENTS

| 3,222,302 | 12/1965 | Bollert et al. | 260—2.5R |
| 3,227,665 | 1/1966 | Fourcade et al. | 260—2.5N |
| 3,232,893 | 2/1966 | Salgado et al. | 260—2.5N |
| 3,260,688 | 7/1966 | Watanabe et al. | 260—2.5N |

MURRAY TILLMAN, Primary Examiner

MORTON FOELAK, Assistant Examiner

U.S. Cl. X.R.

260—16, 22, 40, 75, 827, 861, 863, 864, 869